United States Patent [19]

Reiter

[11] 4,336,971
[45] * Jun. 29, 1982

[54] UNITIZED MULTIROW TAPERED ROLLER BEARING

[75] Inventor: Gerhard Reiter, Massillon, Ohio

[73] Assignee: The Timken Company, Canton, Ohio

[ * ] Notice: The portion of the term of this patent subsequent to Nov. 25, 1997, has been disclaimed.

[21] Appl. No.: 172,816

[22] Filed: Jul. 28, 1980

Related U.S. Application Data

[63] Continuation of Ser. No. 971,919, Dec. 21, 1978, Pat. No. 4,235,485.

[51] Int. Cl.³ ............................................. F16C 33/78
[52] U.S. Cl. .................................. 308/187.2; 308/214
[58] Field of Search ............. 308/187.2, 187.1, 207 R, 308/214, 218, 208, 212, 213, 209

[56] References Cited

U.S. PATENT DOCUMENTS

| | | | |
|---|---|---|---|
| 1,593,580 | 7/1926 | Knowles . | |
| 2,130,258 | 9/1938 | Baker et al. | 308/214 |
| 2,586,406 | 2/1952 | Wallgren | 308/214 |
| 3,656,825 | 4/1972 | Manger | 308/213 |
| 3,689,127 | 9/1972 | Hampp et al. | 308/214 |
| 3,733,109 | 5/1973 | Hallerback | 308/216 |
| 3,966,282 | 6/1976 | Overton | 308/207 R |
| 4,092,048 | 5/1978 | Bennett et al. | 308/207 R |

FOREIGN PATENT DOCUMENTS 57197 2/1919 Sweden .
1235649 6/1971 United Kingdom .

Primary Examiner—Lenard A. Footland
Attorney, Agent, or Firm—Gravely, Lieder & Woodruff

[57] ABSTRACT

A multirow bearing for supporting a work or back-up roll of a rolling mill includes inner and outer races and tapered rollers arranged in two end rows and two intermediate rows between corresponding raceways on the inner and outer races. The inner race is a unitary structure, while the outer race is comprised of two double cups. The tapered rollers of the intermediate rows have their large ends presented toward each other and those ends bear against a center thrust rib that may be free to float in the axial direction so as to equalize radial loads between the rollers of the two intermediate rows. The radial clearance between these rollers and their respective raceways can be less than the clearance between the rollers of the end rows and their respective raceways so that the rollers of the intermediate rows carry most of the radial loading. Also, the rollers of the end rows can be at a steeper angle than the rollers of the intermediate rows, and are therefore better able to accommodate thrust loads and moments. The large ends of the rollers in the end rows bear against rib rings that are secured to the double cups of the outer race by seal cases which serve to unitize the bearing for handling purposes. Seal elements are bonded to the seal cases and they bear against the inner races to close the ends of the bearing.

7 Claims, 7 Drawing Figures

UNITIZED MULTIROW TAPERED ROLLER BEARING

This application is a continuation of application Ser. No. 971,919, filed Dec. 21, 1978, now U.S. Pat. No. 4,235,485.

BACKGROUND OF THE INVENTION

This invention relates in general to bearings and more particularly to a multirow bearing containing tapered rollers.

The rolling mills in which plates, strips, and other shapes are reduced in thickness contain opposed work rolls between which the steel shape passes, and often back-up rolls which bear against the surfaces of the work rolls to rigidify them so that they do not spread apart to any significant extent as the shape passes between them. The ends of the work and back-up rolls are reduced in diameter to provide so-called roll necks, and these roll necks are received in bearings which in turn are mounted in housings called chocks. Since the spreading and other deflecting forces on the work rolls are of substantial magnitude, the back-up rolls must be capable of sustaining high radial loads and must otherwise be of a highly durable construction. Frequently, they are tapered roller bearings having their tapered rollers arranged in four rows with the large diameter ends of the rollers in two of the rows facing in one axial direction and the large diameter ends of the rollers in the other two rows facing in the opposite axial direction. Various arrangements of these rows are possible.

To facilitate removal of the bearings from the roll necks, a loose fit is usually provided between the inner races of a bearing and the roll neck around which it fits, and this enables contaminants to migrate along the roll neck and enter the interior of the bearing at the abutment between the two double cones that constitute the inner race.

Not only does the plate, strip, or other shape that is being rolled tend to spread the rollers apart, but it also tends to deflect the work rolls in the horizontal direction, this being due to differential strip tensions or work roll offset. The work roll chocks, however, fix the bearings firmly in place and consequently as to each bearing the rollers of the two rows closest to the working surfaces of the roll take a higher radial load than the rollers of the two outer rows, although this increased load is not shared evenly between those rollers.

Aside from the foregoing, the seals that protect conventional roll neck bearing arrangements are remote from the bearings and are often damaged when the roll is removed for regrinding and thereafter replaced, which occurs frequently insofar as the work rolls are concerned. For example, the innermost seal of at least one of the bearings is sometimes inverted when the roll is replaced and the bearings are installed around its necks. An inverted seal, of course, allows contaminants to enter the interior of the bearing where they have a deleterious effect.

SUMMARY OF THE INVENTION

One of the principal objects of the present invention is to provide a four row tapered roller bearing which is ideally suited for supporting the rolls of rolling mills. Another object is to provide a bearing of the type stated that has a one-piece inner race that prevents contaminants which migrate along the roll neck from entering the interior of the bearing. A further object is to provide a bearing of the type stated that has seals mounted upon its outer race with the seals serving to unitize the bearing for handling purposes. An additional object is to provide a bearing of the type stated in which rollers of the two intermediate rows may carry most of the radial loading and the rollers of the two end rows may take most of the thrust loading and resist overturning moments. Still another object is to provide a bearing of the type stated in which the radial load on the rollers of the two intermediate rows is distributed evenly between those rows. Still another object is to provide a bearing of the type stated which is sealed, even when removed from its chock and roll neck, and therefore is less susceptible to deterioration from contamination.

These and other objects and advantages will become apparent hereinafter.

The present invention is embodied in a multirow bearing having a unitized inner race and a segmented outer race and tapered rollers between corresponding raceways of the two races in intermediate and end rows. End rib rings are held against the ends of the outer race by seal cases and unitize the bearing for handling purposes. The invention is also embodied in a multirow bearing having rolling elements arranged in intermediate and other rows between corresponding raceways on inner and outer races. The rolling elements of the other rows are tapered rollers having the large diameter ends presented away from each other. The radial clearance in the other rows is greater than the radial clearance, if any, in the intermediate rows. The invention is also embodied in a bearing in which the rolling elements of all rows are tapered rollers, with the tapered rollers of the intermediate rows being at a lesser angle than the rollers of the other rows and having their large ends presented toward each other. The invention in addition involves the combination of a mill chock, a roll having a roll neck, and the foregoing bearings in the chock and around the roll neck. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
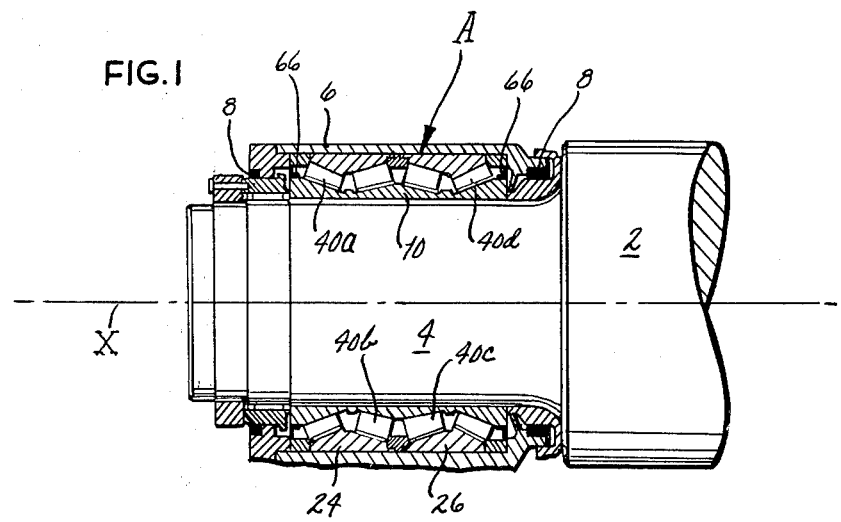
FIG. 1 is a fragmentary sectional view of a rolling mill roll, the roll neck of which projects into a chock on the millframe and is supported in the chock by the multirow bearing of the present invention.

Referring now to the drawings (FIG. 1), A designates a multirow tapered roller bearing that is particularly suitable for positioning and supporting the work and back-up rolls 2 of a rolling mill. Each roll 2 of the mill, whether it be a work or back-up roll, has roll necks 4 at its ends, these being nothing more than reduced end portions, and each roll neck 4 is received in a bearing A. The bearings A, in turn, are clamped and otherwise held firmly in chocks 6 that are secured to the mill frame. The chocks 6 contain the usual retaining arrangements and are further provided with conventional seals 8 beyond the ends of the bearings A. Thus, the bearings A enable the roll 2 to rotate about an axis X.

Each bearing A includes (FIG. 2) a unitized one-piece inner race 10 having a bore 12 extended through it and that bore is about the same diameter as the roll neck 4, so that the roll neck 4 will fit through it. Preferably, the bore 12 is slightly larger in diameter than the roll neck 4 so that a loose fit exists between the two to facilitate removal of the bearing A. At its ends the inner race 10 has end faces 14 that are squared off with respect to the axis X, and between the two end faces 14 it is provided with four tapered raceways 16 $a, b, c, d$ arranged in that order. The two intermediate raceways 16$b$ and 16$c$ are located on opposite sides of the midpoint for the bearing A and taper downwardly away from the midpoint. The two end raceways 16$a$ and 16$d$ are located beyond the small diameter ends of the intermediate raceways 16$b$ and 16$c$, respectively, and taper outwardly toward the end faces 14. The inclination or taper of the intermediate raceway 16$b$ is the same as that for the other intermediate raceway 16$c$, and likewise the inclinations of the two end raceways 16$a$ and 16$b$ are equal. However, the end raceways 16$a$ and 16$b$ may be at a steeper angle than the intermediate raceways 16$b$ and 16$c$.

Separating the two intermediate raceways 16$a$ and 16$c$ is a cylindrical intervening surface 18 which merges into the large diameter ends of the raceways 16$b$ and 16$c$. The raceways 16$a$ and 16$b$, on the other hand, are separated by retaining ribs 20, and likewise so are the raceways 16$c$ and 16$d$, these ribs 20 being at the small diameter ends of the raceways 16 $a, b, c, d$. Beyond the large diameter ends of the end raceways 16$a$ and 16$d$ are cylindrical extensions 22 which run out to and terminate at the end faces 14. Indeed, the large diameter ends of the end raceways 16$a$ and 16$d$ merge directly into the cylindrical extensions 22 without any intervening thrust ribs.

Figure 2:
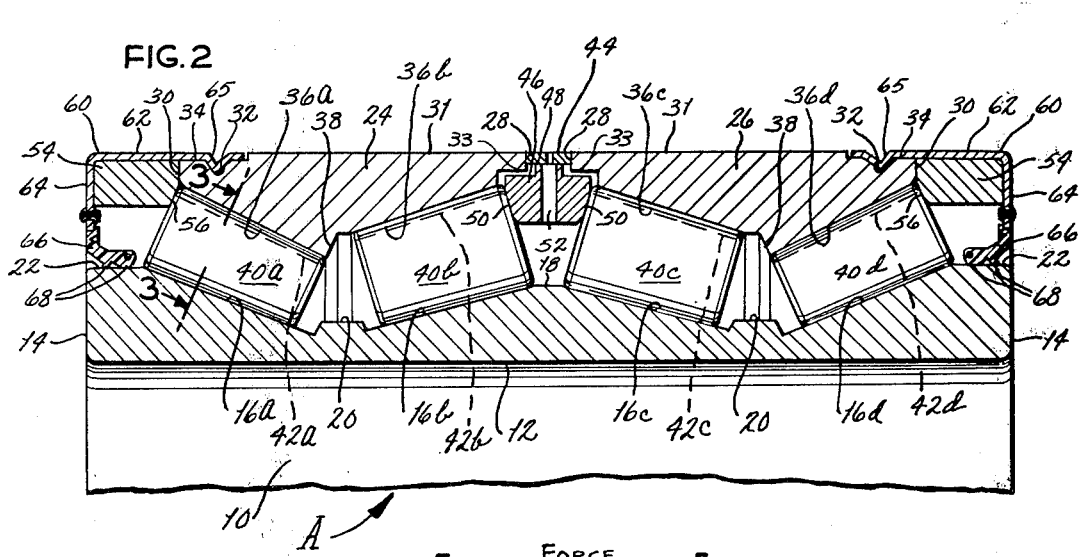
FIG. 2 is an enlarged fragmentary sectional view of the bearing.

Surrounding the two raceways 16$a$ and 16$b$ is a double cup 24 and likewise surrounding the other two raceways 16$c$ and 16$d$ is another double cup 26 (FIG. 2). The two cups 24 and 26 are identical in every respect, except for being reversed in position with respect to each other, and together they constitute a segmented outer race that surrounds the unitary inner race 10. Each cup 24 and 26 has two end faces 28 and 30, which are squared off with respect to the axis X and a cylindrical outer surface 31 that fits snugly within the chock 6. The end faces 28 for the two cups 24 and 26 face each other, while the other end faces 30 face away from each other. The outer surface 31, while extending all the way to the end face 28 for its cup 24 or 26, terminates short of the other end face 30, there being an annular groove 32 and a turned down surface 34 in that order between the end of the cylindrical surface 32 and the other end face 30.

In addition to the foregoing, each cup 24 and 26 has a pair of inwardly presented raceways 36 which are located opposite of corresponding raceways 16 on the inner race 10. More specifically, the cup 24 has raceways 36$a$ and 36$b$ which are located opposite the raceways 16$a$ and 16$b$, respectively, of the inner race 10 and likewise taper in the same direction. The large diameter end of the raceway 36$a$ runs out to a chamfer at the end face 30 on the cup 24 while, the large diameter end of the raceway 36$b$ runs all the way out to an offset 33 ahead of the end face 28. Being part of a tapered roller bearing, the corresponding raceways 16$a$ and 36$a$, if extended to their respective apexes, would have those apexes located at the same point along the axis X of rotation for the bearing A. The same holds true with respect to the corresponding raceways 16$b$ and 36$b$. The tapers of the two raceways 36$a$ and 36$b$ on the cup 24 may differ, and to compensate for this, an offset 38 exists between the small diameter ends of the two raceways 36$a$ and 36$b$.

The double cup 26, on the other hand, has tapered raceways 36$c$ and 36$d$ which are located opposite from the raceways 16$c$ and 16$d$ on the inner face 10. Since the cup 26 is identical to the cup 24, the raceways 36$c$ and 36$d$ are identical to the raceways 36$a$ and 36$b$, respectively, except that they taper in opposite directions. Thus, the raceways 16$c$ and 36$c$, if extended to their apexes, will have their apexes located at a common point along the axis X, and so will the raceways 16$d$ and 36$d$.

The raceways 36$a$ and 36$d$ constitute the end raceways for the outer race comprised of the two double cups 24 and 26 and correspond with the end raceways 16$a$ and 16$d$ of the inner race 10, while the raceways 36$b$ and 36$c$ constitute the intermediate raceways of the outer race and correspond with the raceways 16$b$ and 16$c$.

Between the corresponding raceways 16$a$ and 36$a$ is a single row of tapered rollers 40$a$; similarly between the raceways 16$b$ and 36$b$ is another row of tapered rollers 40$b$; between the raceways 16$c$ and 36$c$ is still another row of tapered rollers 40$c$; and between the raceways 16$d$ and 36$d$ is yet another row of tapered rollers 40$d$. The rollers 40 of each row have their side faces against the inner raceway 16 and outer raceway 36 for that row, and consequently if each roller 40 of the row is extended to an apex, that apex would lie along the axis X of the bearing A and would be at the same location as the common apex for the two raceways 16 and 36 between which it is located. Since the raceways 16$a$ and 16$d$ and the raceways 36$a$ and 36$d$ have corresponding tapers, the rollers 40$a$ and 40$d$ which fit between them are identical. These rollers constitute the end rows. The same holds true with respect to the rollers 40$b$ and 40$c$ which fit between the corresponding raceways 16$b$ and 36$b$ and the corresponding raceways 16$c$ and 36$c$, these rollers constituting the intermediate rows. However, if the tapers of the intermediate raceways 16$b$ and 36$b$ and 16$c$ and 36$c$ differ from the tapers of the end raceways 16$a$ and 36$a$ and 16$d$ and 36$d$, the rollers 40$a$ and 40$d$ of the end rows will differ in configuration from the rollers 40$b$ and 40$c$ of the intermediate rows. In that case, the rollers 40$a$ and 40$d$ of the end rows will be oriented at a steeper angle with respect to the axis X than the rollers 40$b$ and 40$c$ of the intermediate rows and accordingly will have a more pronounced taper.

Figure 3:
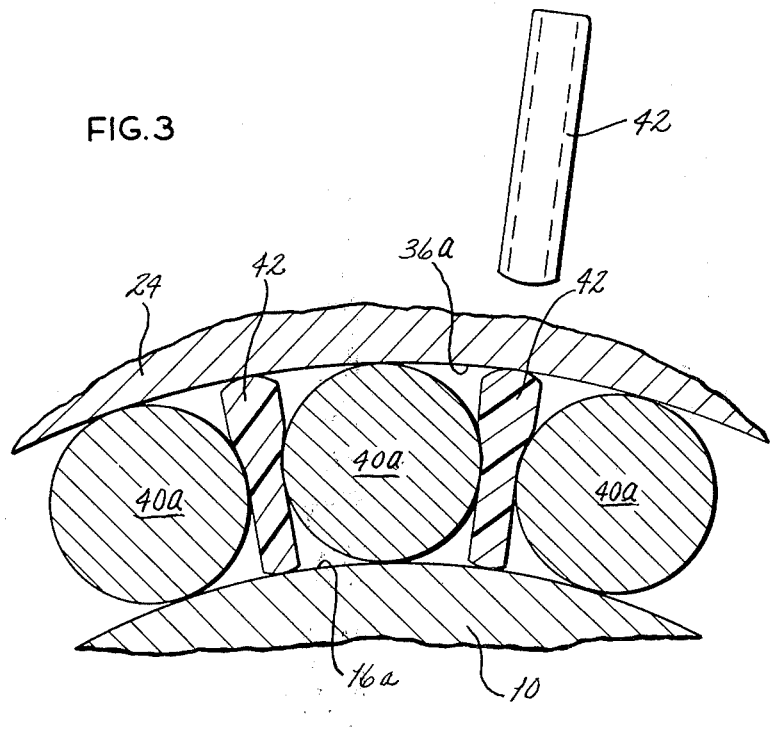
FIG. 3 is a sectional view taken along line 3—3 of FIG. 2 and showing separators for maintaining proper spacing between the tapered rollers, one of the separators further being illustrated in plan.

The proper spacing between the individual rollers 40 of each of the four rows is maintained by separators 42 (FIG. 3) having side faces which generally conform to the side faces of the rollers 40. As a consequence, the separators 42 $a$, $b$ for the end rows of rollers 40$a$ and 40$d$ may be different from the separators 42 $b$, $c$ for the intermediate rows of rollers 40$b$ and 40$c$. The separators 42 for any row of rollers 40 are detached from one another and are preferably molded from a plastic which is durable enough to withstand normal operating temperatures for the bearing A, but nevertheless will melt when the bearing A reaches excessively high temperature as the result of loss of its normal lubrication. Upon melting, the plastic will serve to lubricate the bearing A long enough to detect the absense of normal lubrication. The separators 42 are contoured at their sides to conform generally to the rollers 40 they separate and are further configured to ride for the most part beyond the center axes of the rollers 40 they separate. As such they are wider, at least on their outwardly presented surfaces than the spacing between the tapered side faces of adjacent rollers 40. The height of each separator 42 is only slightly less than the spacing between the opposed raceways 16 and 40 along which the rollers it separates run. Conventional stamped steel cages that move on center with the rollers 40 may be used in lieu of the separators 42.

The two double cups 24 and 26 are separated by a spacer ring 44 (FIG. 2) against which the end faces 28 of the cups 24 and 26 abut. Along its ends, the ring 44 projects no farther inwardly than the large diameter ends of the inner raceways 36$b$ and 36$c$ on the cups 24 and 26, respectively. The spacer ring 44 prevents the double cups 24 and 26 from moving together, and thereby serves to position the cups 24 and 26 relative to each other. It may be a so-called interrupted rolled ring or it may be solid, and in the latter instance it may further be provided with a greasing aperture.

Located within the spacer ring 44 is a center rib ring 46 having a positioning rib 48 that projects outwardly and fits loosely within the spacer ring 44. The rib ring 46 has end surfaces 50 that are beveled to conform to the angle of the large diameter end faces of the tapered rollers 40$b$ and 40$c$ of the two intermediate rows. Indeed, the large end faces of the rollers 40$b$ and 40$c$ bear against the beveled end surfaces 50 so that the rib ring 46 prevents the rollers 40$b$ and 40$c$ from moving together under radial loading. In this regard, the rollers 40$b$ and 40$c$, by reason of their taper and orientation, will tend to move toward the center of the bearing A when subjected to radial loading, but the rib ring 46 functions as a stop. The beveled end surfaces 50 of the rib ring 46 further serve to properly orient the rollers 40$b$ and 40$c$ along their respective raceways so that they do not skew. Since, the rib ring 46 fits loosely within the spacer ring 44, it is free to shift in the axial direction, and this freedom to float enables it to equalize radial loads between the two rows of inner rollers 40$b$ and 40$c$. The rib ring 46, has a greasing aperture 52.

Fitted against the end faces 30 of the two double cups 24 and 26 are end rib rings 54 that surround the cylindrical extensions 22 on the inner race 10. The end rib rings 54 extend inwardly past the large diameter ends of the end raceways 36$a$ and 36$d$ on the cups 24 and 26 and have beveled abutment surfaces 56 that are presented toward the interior of the bearing A. The abutment surfaces 56 are beveled at an angle that conforms to the large diameter end faces for the rollers 40$a$ and 40$d$ of the end rows. Indeed, the large end faces of the rollers 16$a$ and 16$d$ bear against the beveled surfaces 56 so that the rib rings 54 prevent the rollers 16$a$ and 16$d$ of the two outer rows from being expelled from the bearing A as a result of the radial loading applied to them. The outside diameter of each rib ring 54 equals the diameter of the turned down surfaces 34 at the ends of the cups 24 and 26.

The bearing A may be constructed such that when the two end rib rings 54, the two double cups 24 and 26, and the spacer ring 44 are clamped tightly together in the proper order, the radial clearance in the end rows of rollers 40$a$ and 40$d$ will exceed the radial clearance in the intermediate rows of rollers 40$c$ and 40$d$. As a consequence, the rollers 40$b$ and 40$c$ of the intermediate rows will carry most of the radial load, but the rollers 40$a$ and 40$d$ of the end rows, being at a steeper angle, are best disposed for taking thrust loads. Also, in this arrangement the rollers 40$a$ and 40$d$ of the end rows are also better equipped to resist overturning moments, because of their location and orientation within the bearing A.

The end rib rings 54 are contained with seal cases 60 which in turn are attached firmly to the double cups 24 and 26 so that the seal cases 60 secure the rib rings 54 against the outer end faces 30 of double cups 24 and 26, at least for handling purposes. Each seal case 60 is a sheet metal stamping including an axial wall 62 and a radial wall 64. The axial wall 62 is sized to snugly receive the rib ring 54 and fit over the turned down surface 34 of the cup 24 or 26. Its outer diameter is no greater than the diameter of the cylindrical surface 31 for the cup 24 or 26 so that the axial wall 62 and cylindrical surface 31 are flush. Initially, the end of the axial wall 62 on each case 60 is straight so that it easily fits over the turned down end surface 34 on the cup 24 or 26, but once the seal case 60 is pressed onto the cup 24 or 26, its axial wall 62 is deformed inwardly into the annular groove 32 adjoining the turned down surface 34 to secure the seal case 60 firmly on the cup 24 or 26. Alternatively, the seal cases 60 may be bonded to their respective cups 24 and 26 such as with an adhesive.

The radial wall 64 of each seal case 60 projects inwardly past the fixed rib ring 54, beyond which an elastomeric seal element 66 is bonded to it. The element 66 has lips 68 which bear against the underlying cylindrical extension 22 on the inner race 10. The seal cases 60 and seal elements 66 constitute seal units which not only close the ends of the bearing A and prevent foreign matter from entering and the lubricant from escaping, but further hold the entire bearing A together so as to unitize it for handling purposes. That portion of the seal element 66 that is bonded to the radial wall of each seal case may contain vents for venting the interior of the bearing A without allowing contaminants to enter.

When the bearing A is installed in a rolling mill, the chock 6 clamps across the radial walls 64 of the two seal cases 60, thereby holding the fixed rib rings 54, the double cup 24 and 26, and the spacer ring 44 all tightly together in the proper order.

To assemble the bearing A all of the raceways 16 and 36 are first well lubricated with a suitable grease. Then the rollers 40$a$ and the separators 42$a$ of the first end row are placed around the raceway 16$a$ of the inner race 10 and the double cup 24 is placed around them. Next, the rollers 40$b$ of the second row are inserted into the annular space between the raceways 16$b$ and 36$b$, along with the separators 42b for that row. Thereafter, the spacer ring 44 is placed against the end face 28 of the cup 24, and the center rib ring 56 is fitted inside of it so that its one beveled face 52 bears against the large diameter end faces of the rollers 40b. Next, the tapered rollers 40c of the other inner row are positioned against the other beveled end face 50 on the center rib ring 46 and along the tapered raceway 16c on the inner race 10, and the separators 42c are fitted between the rollers 40c. Then, the other double cup 26 is fitted over the inner race 10 until its inner end face 28 comes against the spacer ring 44. Thereafter, the rollers 40d and their separators 42d are fitted between the raceways 16d and 36d. Finally, the end rib rings 54 and seal cases 60 are installed to prevent the rollers 40a and 40d of the end rows from dropping out of the bearing A.

Figure 4:
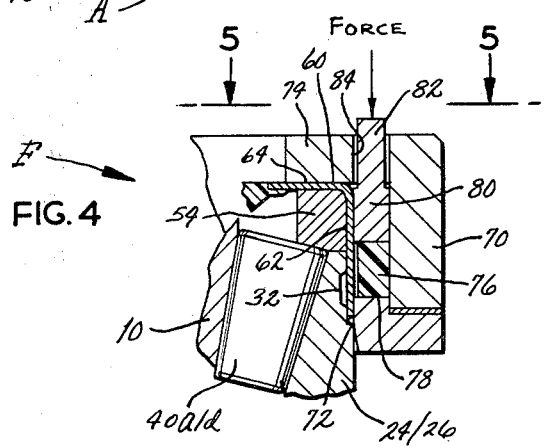
FIG. 4 is a fragmentary sectional view of an assembly fixture used to deform the ends of the seal cases into grooves in the double cup of the bearing.
Figure 5:
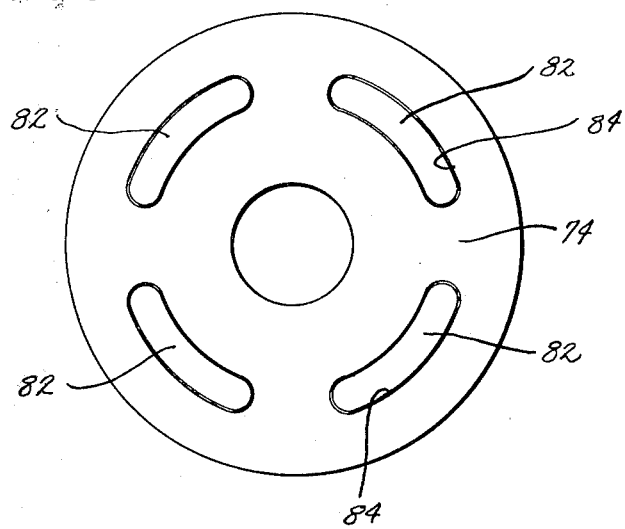
FIG. 5 is an end view of the assembly fixture taken along line 5—5 of FIG. 4.

The axial wall 62 of each seal case 60 may be deformed into its annular groove 32 on the cup 24 or 26 by any number of procedures. Perhaps the most suitable involves an assembly fixture F (FIGS. 4 & 5) including a main body 70 having a bore 72 which snugly receives the seal case 60 along with the particular double cup 24 or 26 over which that seal case 60 is fitted. The end rib ring 54 and seal case 60 are advanced into the bore 72 until the radial wall 64 of the seal case 60 abuts an end wall 74 at the end of the bore 72. This positions the double cup 24 or 26 with its annular groove 32 directly opposite an elastomeric ring 76, one end of which abuts against a shoulder 78 on the body 70. The opposite end of the elastomeric ring 76 bears against a transfer ring 80 that surrounds the axial wall 62 of the seal case 60. The outside surface of the elastomeric ring 76 is confined by the body 70 of the fixture F itself. The transfer ring 80 is castellated in that it has bosses 82 which project upwardly through apertures 84 in the end wall 74 of the body 70. When these bosses 82 are driven downwardly to a position flush with the upper surface of the fixture body 70, the elastomeric ring 76 is deformed sufficiently to drive the portion of the axial wall 62 for the seal case 60 into the annular groove 32 which it surrounds, thereby securing the axial wall 62 so that the seal case 60 cannot be withdrawn from the cup 24 or 26 to which it is attached.

In the operation of the bearing A, the seal elements 66 and seal cases 60 prevent the ingress of contamination and the latter further serve to completely unitize the bearing A so that it may be handled as a unit. This prevents the seal elements 66 from being damaged or installed incorrectly when the bearing A is removed from the roll neck 4 to replace or service the roll 2. In this same vein, the single piece inner race 10 prevents contamination that may migrate through the bore 12 from entering the interior of the bearing A and damaging it. In this regard, it is desirable to have the roll neck 4 loosely fitted in the bore 12 of the inner race 10 to facilitate removal of the bearing A.

The plastic separators 42 not only maintain the correct spacing between adjacent rollers 40 of each row, but further serve as an additional source of lubrication should the bearing become starved for lubrication. More specifically, if the bearing runs hot due to a lack of lubrication, the separators 42 will melt and lubricate the bearing A, at least long enough to give the operator of the rolling mill an opportunity to notice the bearing distress. As a consequence, the bearing A may be removed before it seizes completely.

The vent aperture 48 in the spacer ring 44 may be used to determine the amount of wear without disassembling the entire bearing A. This is accomplished by observing the axial displacement of the floating rib ring 46 through the vent hole in the spacer ring 44 as the bearing A is turned from one upright position to the other.

While it is not essential to have the clearance in the intermediate rows of rollers 40b and 40c less than that of the end rows, or to have the rollers 40b and 40c of the intermediate rows at a lesser angle than those of the end rows, or to allow the center rib ring 46 to float, these features do offer certain advantages which render the bearing A better able to withstand sizeable forces applied to the roll 2. In particular, the intermediate rows of rollers 40b and 40c take most of the radial load inasmuch as those rollers operate with less radial clearance and are at a lesser contact angle than the rollers 40a and 40d of the end rows. However, the rollers 40a and 40d at the end rows do accommodate some of the radial loading. Since the center rib ring 46 is free to float in the axial direction, it assumes a position which enables the rollers 40b and 40c of the two intermediate rows to share the load equally, or in other words, it causes the radial load that is taken by the rollers 40b and 40c to be distributed evenly between the two intermediate rows in which those rollers are disposed. The floating center rib ring 46 further facilitates bearing setting and enables the load sharing capabilities to remain effective despite changes in bearing clearance caused by deflection, deformation, thermal expansion, and wear.

When the end rows of rollers 16a and 16d are at a steeper contact angle than the intermediate rows 40b and 40c, the bearing A is well configured for withstanding and resisting the moments created by differential strip tensions applied to the roll 2 as well as by the spreading forces imposed on the roll 2. In other words, the rollers 16d of the end row are best positioned to accommodate the moments imposed on the bearing A as a result of the bearing A being secured in a firm position by the chock 6. Since the radial clearance between the rollers 40b and 40c of the two intermediate rows and their respective raceways is less than the radial clearance between the end rollers 40a and 40d and their respective raceways, the rollers 40b and 40c take most of the radial loading, and this leaves the rollers 40a and 40d available to better accommodate the overturning moments.

MODIFICATIONS

Figure 6:
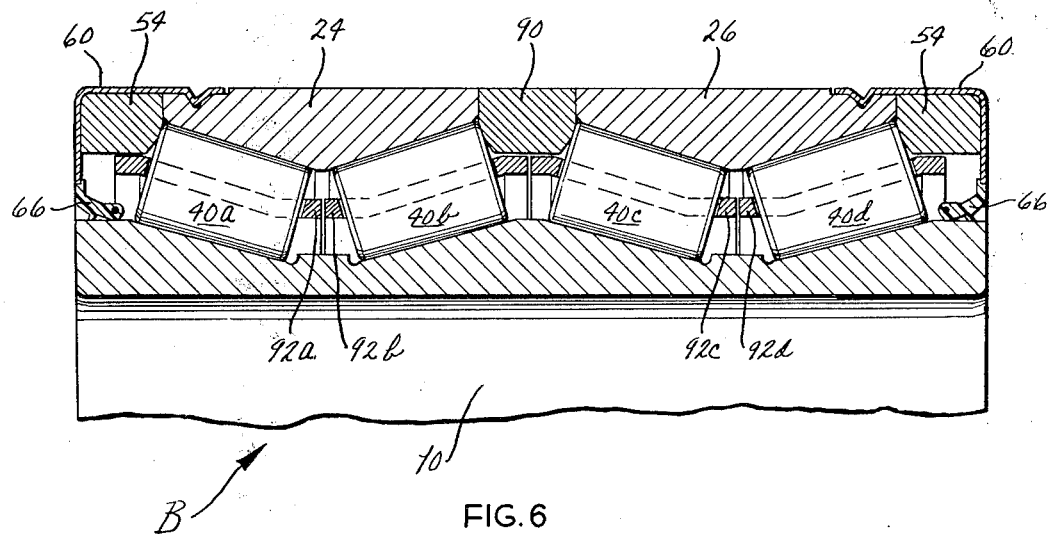
FIG. 6 is a sectional view of a modified multirow bearing.

A modified multirow bearing B (FIG. 6) is very similar to the bearing A, except that the spacer ring 44 and center rib ring 46 are combined into a single center rib ring 90. Also, the rollers 40 of the four rows are spaced by cages 92 instead of individual separators 42. Since the center rib ring 90 does not float, it does not have the capability of equalizing loads between the two intermediate rows of rollers 40b and 40c. Nevertheless, it does reduce manufacturing costs. To facilitate assembly, the cages 92 should ride at a radius that is the same as the radius followed by the centers of the rollers 40 confined by them as those rollers revolve between their respective raceways 16 and 36. The cages 92 may be guided by the rib rings 90 and 46 along which their ends are located.

Figure 7:
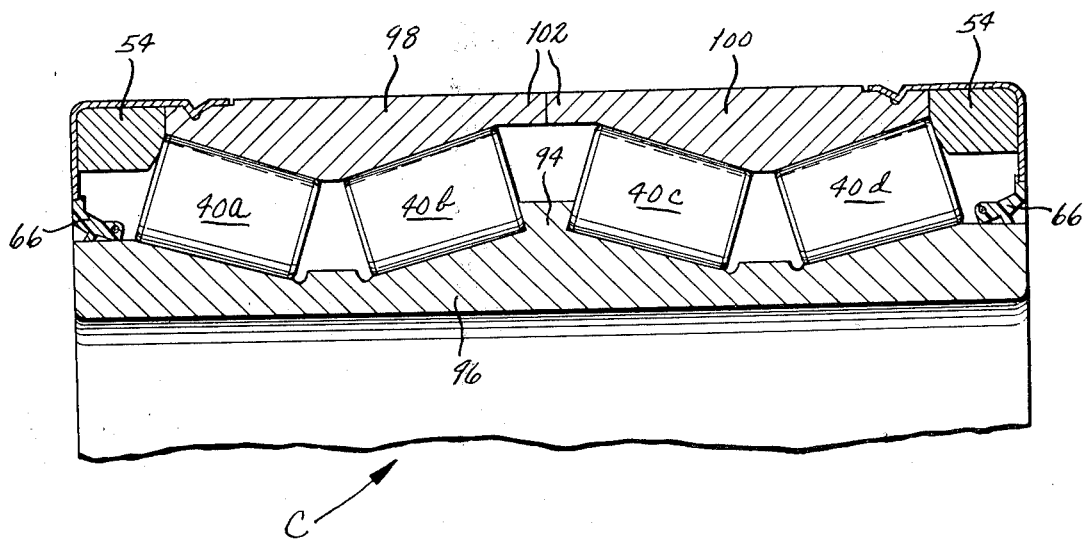
FIG. 7 is a sectional view of another modified multirow bearing.

Another modified multirow bearing C (FIG. 7) is similar to the bearing A, except that in lieu of a center rib ring 46, it has a thrust rib 94 formed integral with a unitary inner race 96 that is otherwise very similar to the inner race 10. The rollers 40b and 40c of the two intermediate rows abut against the rib 94. Surrounding the inner race 96 are double cups 98 and 100 which are quite similar to the cups 24 and 26, except that they are provided with axial extensions 102 that project toward each other and abut each at the center of the bearing C.

Cylindrical rollers may be used in the intermediate rows in lieu of the shallow angle tapered rollers 40b and 40c. Also, the bearings A and B are suitable for purposes other than supporting the rolls 2 of rolling mills.

This invention is intended to cover all changes and modifications of the example of the invention herein chosen for purposes of the disclosure which do not constitute departures from the spirit and scope of the invention.

What is claimed is:

1. A multirow bearing comprising: an inner race having a pair of tapered end raceways and at least one intermediate raceway located between the end raceways, the end raceways having their large ends presented away from each other and away from the intermediate raceway; an outer race having at least one intermediate raceway surrounding the intermediate raceway of the inner race and a pair of end raceways surrounding the end raceways of the inner race so that each raceway on the outer race surrounds and corresponds to a different raceway on the inner race; rollers arranged in rows between corresponding raceways of the inner and outer races, there being a different row of rollers between each set of corresponding intermediate and end raceways; end rib rings located against the ends of the outer race and projecting inwardly past the large diameter ends of the end raceways such that the large ends of the rollers in the end rows abut against the end rib rings and are prevented from being expelled from the bearing by the rib rings; seal cases fitted over the end rib rings, the seal cases being configured to capture the rib rings therein such that the rib rings cannot move axially away from the outer race and further being secured to the outer race to unitize the bearing for handling purposes; and sealing means on the seal cases for cooperating with the inner race to form barriers at the ends of the bearing.

2. A multirow bearing according to claim 1 wherein the outer race is segmented and the tapered end raceways of the outer race are on different segments of the outer race.

3. A multirow bearing according to claim 2 wherein a pair of intermediate raceways are located on the inner race, and a pair of intermediate raceways are on the outer race.

4. A multirow bearing according to claim 3 and further comprising means located between the intermediate rows of rollers for separating the rollers of the two intermediate rows in the axial direction.

5. A multirow bearing according to claim 4 wherein the means located between the intermediate rows of rollers is a rib ring that is free to shift axially with respect to the inner and outer races.

6. A multirow bearing comprising: an inner race having a pair of tapered end raceways and at least one intermediate raceway located between the end raceways, the end raceways having their large ends presented away from each other and away from the intermediate raceways; an outer race having at least one intermediate raceway surrounding the intermediate raceway of the inner race and a pair of end raceways surrounding the end raceways of the inner race so that each raceway on the outer race surrounds and corresponds to a different raceway on the inner race, the outer race further having outwardly opening grooves set slightly inwardly from its ends; rollers arranged in rows between corresponding raceways of the inner and outer races, there being a different row of rollers between each set of corresponding intermediate and end raceways; end rib rings located against the ends of the outer race and projecting inwardly past the large diameter ends of the end raceways such that the large ends of the rollers in the end rows abut against the end rib rings and are prevented from being expelled from the bearing; retaining elements surrounding the outer race at its ends and also the end rib rings, the retaining elements being projected into the grooves of the outer race to interlock the elements with the outer race and further being engaged with the rib rings such that the rib rings are prevented from moving away from the ends of the outer race, whereby the bearing is unitized for handling purposes; and sealing means at the ends of the bearing for forming barriers between the end rib rings and the inner race.

7. A multirow bearing according to claim 6 wherein the retaining elements are formed from metal and are deformed into the grooves.

* * * * *